United States Patent
Kim et al.

(10) Patent No.: US 11,653,203 B2
(45) Date of Patent: *May 16, 2023

(54) METHOD AND APPARATUS TO VERIFY A BASE STATION BASED ON SYSTEM INFORMATION AND DEDICATE CONTROL INFORMATION

(71) Applicants: Soenghun Kim, Suwon-si (KR); Suyoung Park, Uiwang-si (KR)

(72) Inventors: Soenghun Kim, Suwon-si (KR); Suyoung Park, Uiwang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,323

(22) Filed: Aug. 18, 2022

(65) Prior Publication Data

US 2022/0394467 A1 Dec. 8, 2022

Related U.S. Application Data

(63) Continuation of application No. 17/175,673, filed on Feb. 14, 2021, now Pat. No. 11,477,645.

(30) Foreign Application Priority Data

Apr. 4, 2020 (KR) .................. 10-2020-0041266

(51) Int. Cl.
*H04W 12/06* (2021.01)
*H04W 4/029* (2018.01)
(Continued)

(52) U.S. Cl.
CPC ........... *H04W 12/06* (2013.01); *H04L 9/3247* (2013.01); *H04W 4/029* (2018.02); *H04W 12/0431* (2021.01); *H04W 76/10* (2018.02)

(58) Field of Classification Search
CPC ... H04W 12/06; H04W 12/04; H04W 12/122; H04W 12/0431; H04W 12/108; H04W 12/63; H04W 12/041; H04W 12/069; H04W 4/025; H04W 48/20; H04W 72/0406; H04W 88/02; H04W 12/104; H04W 12/106; H04W 12/126; H04W 48/12; H04W 12/0433; H04W 12/062; H04W 12/068; H04W 4/70; H04W 48/10; H04W 48/16; H04W 60/04; H04W 76/27;
(Continued)

(56) References Cited

U.S. PATENT DOCUMENTS

| | | | |
|---|---|---|---|
| 11,477,645 B2 * | 10/2022 | Kim ............... | H04W 4/029 |
| 2019/0349765 A1 | 11/2019 | Kolekar et al. | |
| 2021/0314771 A1 * | 10/2021 | Kim ............... | H04L 9/3247 |

FOREIGN PATENT DOCUMENTS

| | | | | |
|---|---|---|---|---|
| EP | 3639544 B1 * | 8/2022 | ........... | H04L 63/068 |
| KR | 20190041482 | 4/2019 | | |

(Continued)

*Primary Examiner* — Matthew C Sams

(57) ABSTRACT

Base station verification method and apparatus for use in a mobile communication system are provided. The method includes receiving by UE multiple sets of verification information from network, selecting a set of verification information, determining verification result by comparing digital signatures broadcasted by the network and digital signature generated by UE based on the verification information, storing, if verification fails, verification failure information and reporting verification failure information when verification succeed.

16 Claims, 4 Drawing Sheets

(51) Int. Cl.
*H04W 76/10* (2018.01)
*H04W 12/0431* (2021.01)
*H04L 9/32* (2006.01)

(58) Field of Classification Search
CPC ..... H04W 8/08; H04W 84/042; H04W 88/08; H04W 4/029; H04W 76/10; H04L 2209/80; H04L 9/0872; H04L 9/14; H04L 9/30; H04L 63/068; H04L 9/0891; H04L 9/3247; H04L 9/3297; H04L 63/062
See application file for complete search history.

(56) References Cited

FOREIGN PATENT DOCUMENTS

| | | | |
|---|---|---|---|
| KR | 20190095934 | 8/2019 | |
| KR | 20190101821 | 9/2019 | |
| WO | WO-2018231426 A1 * | 12/2018 | ........... H04L 63/068 |

* cited by examiner

METHOD AND APPARATUS TO VERIFY A BASE STATION BASED ON SYSTEM INFORMATION AND DEDICATE CONTROL INFORMATION

CROSS-REFERENCE TO RELATED APPLICATION(S)

This application is based on and claims priority under 35 U.S.C. 119 to Korean Patent Application No. 10-2020-0041266, filed on 2020 Apr. 4, in the Korean Intellectual Property Office, the disclosure of which is herein incorporated by reference in its entirety.

TECHNICAL FIELD

The present disclosure relates to a mobile communication system. More specifically the present disclosure relates to the apparatus and procedure to verify a base station, to store relevant information when verification fails and to report the information when verification succeed.

BACKGROUND

Mobile communication system is being developed to 5G system to meet the traffic demand having increased since 4G mobile communication commercialization. To achieve high data throughput, 5G system is designed with the consideration for mmWave frequency bands like 60 GHz where high path loss and short coverage need to be overcome.

In high frequency band, to increase the coverage and to reduce the pathloss, 5G communication system adopts new techniques such as beam forming, massive MIMO, array antenna, analog beam forming and large-scale antenna.

In addition, 5G communication system is developing advanced small cell, cloud radio access network: cloud RAN, ultra-dense network, Device to Device communication: D2D, wireless backhaul, moving network, cooperative communication, Coordinated Multi-Points and interference cancellation.

Various approach is being made in 5G communication system to deploy IOT. For example, technologies such as sensor network, Machine to Machine and Machine Type Communication are converged with new technologies like beam forming, MIMO and array antenna. With such developments, mobile communication system can provide various services. Security is an important issue in mobile communication system. Especially concern on security attack exploiting the fact that base station verifies the UE (User Equipment) but UE does not verify the base station is growing.

SUMMARY

Aspects of the present disclosure are to address at least the above-mentioned problems. Accordingly, an aspect of the present disclosure is to provide a method and an apparatus to defend the security attack executed by fake base station.

In accordance with an aspect of the present disclosure, a method to receive verification information from network is provided. In the method, UE receives multiple sets of 1st verification information in a RRC control message and receives 2nd verification information, 3rd verification information and 4th verification information In accordance with another aspect of the present disclosure, a method to select the $1^{st}$ verification information based on the $2^{nd}$ verification information.

In accordance with another aspect of the present disclosure, a method to determine verification result by comparing digital signature in $3^{rd}$ verification information and digital signature generated by the selected $1^{st}$ verification information, $2^{nd}$ verification information and $4^{th}$ verification information.

In accordance with another aspect of the present disclosure, a method to store verification failure information when verification fails and to report the verification failure information when verification succeed.

DETAILED DESCRIPTION

To prevent security attack on base stations, having various counter-measure is important. First of all, UE shall be able to verify base station. If UE found a fake base station, UE should report it to genius base station as quickly as possible to prevent further damage from the fake base station.

The present disclosure presents the method and apparatus for UE to verify the base station, to store in the memory the information related with the verification and to report the information to the base station at appropriate time.

Figure 1:
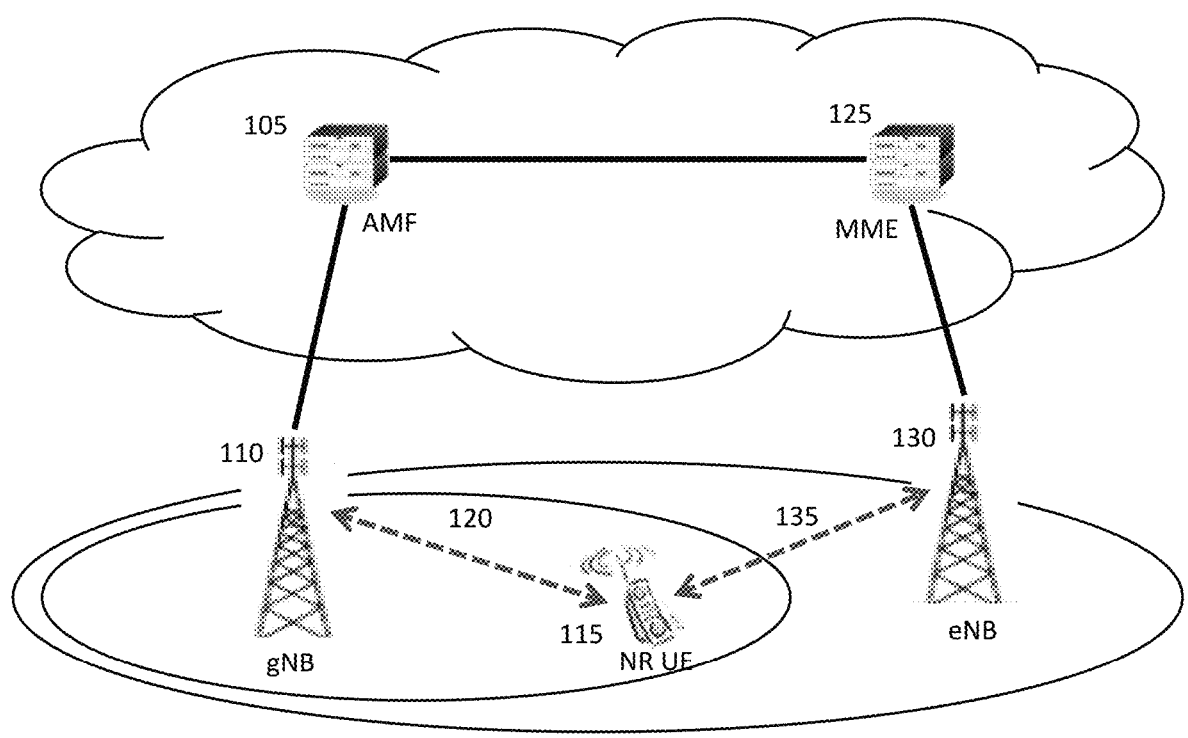
FIG. 1 is a diagram illustrating a mobile communication system architecture according to various embodiments of the present disclosure.

Referring to FIG. 1, a radio access network of a next generation mobile communication system includes a next generation base station (New Radio Node B, gNB) 110 and mobility management function (AMF) 105. A user terminal (new radio user equipment (NR UE) or terminal (UE)) 115 may be connected to an external network via gNB 115 and AMF 105.

Meanwhile, in FIG. 1, the gNB 110 may correspond to a base station (evolved node B (eNB)) 130 of an existing LTE system. The gNB 110 is connected to the NR UE 115 via a radio channel and may provide a service superior to the existing node B (base station). In the next generation mobile communication system, since all user traffics are served through a shared channel, an apparatus for collecting state information such as a buffer state, an available transmission power state, and a channel state of the UEs to perform scheduling is required. The NR NB may play a role of the apparatus. One gNB 110 may typically control multiple cells.

Figure 2:
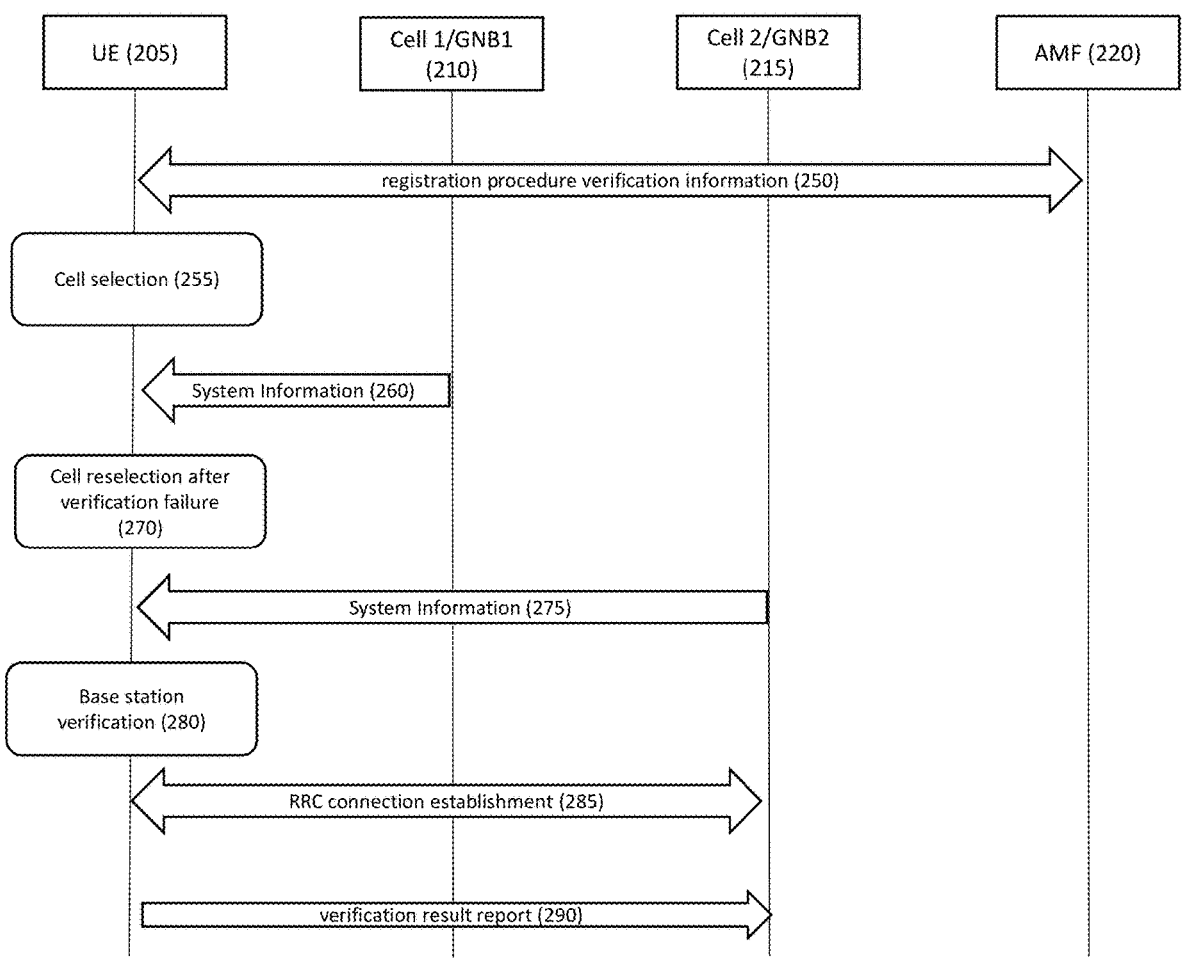
FIG. 2 is a signal flow diagram illustrating a procedure for transmitting and receiving signals at a UE and base station in a mobile communication system according to the $1^{st}$ embodiment of the present disclosure.

FIG. 2 illustrates a procedure according to the embodiment of the present disclosure for UE, gNB and AMF.

UE (205) receives from the AMF (220) the control information on the base station verification via registration procedure (250). UE selects cell 1 (255) and receives a system information via a common channel (260). The system information and the common channel carry the information related with base station verification. The common channel includes SS/PBCH (Synchronous Signal/Primary Broadcast Channel) and PDSCH (Physical Downlink Shared Channel).

UE verifies cell 1/base station 1 using the information on base station verification received via common channel of the current cell and the information on base station verification received from AMF. If verification on cell 1/base station 1 fails, UE consider the current cell as barred cell and reselect a cell 2 which is different from the cell 1 (270). UE receives a system information in the re selected cell (275), updates the information on base station verification, and verify the base station using the updated information (280). If verification succeeds, UE performs RRC connection establishment procedure via cell 2 (285). RRC connection establishment procedure comprises with exchange of RRCSetupRequest message, RRCSetup message and RRCSetupComplete message. UE can include in RRCSetupComplete message information indicating base station verification result information is available. Alternatively, UE can include the base station verification result information itself in the RRCSetupComplete message if certain condition is fulfilled.

If UE did not report the base station verification result information in 285, UE sends a specific RRC message including the base station verification result information based on the base station's instruction. The specific RRC message can be UEInformation or UEAssistanceInformation.

Base station 2 reports the base station verification information to AMF. AMF reports the base station verification information to a core network entity related to security. The core network entity related to security takes necessary measure to increase the security level in the region where fake base station is found.

The present disclosure is explained in more details using various embodiments.

AMF provisions public key (K-SIGpublic) and provide it to the base stations. In the various embodiments, AMF is associated with at least one TAI (Tracking Arear Identity). In the various embodiments, K-SIGpublic can have different value for each tracking area.

UE performs attach procedure according to the initial access procedure. In various embodiments, attach procedure can include the procedure where UE deliver RRC connection establishment message to the base station 1. In various embodiments, attach procedure can include the procedure where registration request message is delivered to the AMF. AMF receives registration request message from UE. AMF sends registration accept message to the UE which include information regarding at least one TAI. In various embodiments, the information regarding at least one TAI includes public key for each TAI (e.g. K-SIGpublic of TAI-1, K-SIGpublic of TAI-2, K-SIGpublic of TAI-3).

In various embodiments, UE state can change to RRC IDLE state after UE completes initial access procedure. According to the $1^{st}$ embodiment, UE state can change to RRC IDLE after UE finish data transmission/reception. UE performs cell reselection procedure in the RRC IDLE state as specified in the standards. In various embodiments, UE can perform cell reselection procedure based on the information received in the current base station (GNB-1). The information can be included in RRC release message transmitted by the current base station (GNB-1). The information can be included in the system information like SIB4, SIB5 or SIB24 transmitted by the current base station (GNB-1).

In various embodiments, the cell reselected by the UE can belong to a different TA. UE can perform the verification procedure for the reselected cell. In various embodiments, the aforementioned cell verification procedure can use at least one system information transmitted in the cell. Aforementioned at least one system information may include time information like UTC (universal time count), base station identification information and digital signature. UE can use information received in registration accept message for cell verification procedure. The information received in registration accept message may include public keys(K-SIGpublic) of TAIs. If cell verification procedure for a reselected cell fails, UE performs cell reselection procedure to reselect a different cell. The cell reselection procedure could be the same procedure as cell selection procedure.

The first example of the system information transmitted in the cell is the system information where digital signature and system information are transmitted together. K-SIG is public key broadcasted by base station. The unique value for the system information can be transmitted in the form of digital signature. Time information can be used for calculating (or deriving) digital signature and can be transmitted as included in the system information. Information regarding algorithm for calculating digital signature can be sent to UE in registration accept message.

Digital signature can be placed in the last part among the system information broadcasted by base station. Digital signature can be placed after the time information among system information. Digital signature can be transmitted in the system information carrying UTC. Digital signature can be transmitted in the system information carrying base station identification information.

The second example is the system information carrying only digital signature. It could be OSI (other system information) excluding the MSI (minimum system information). In various embodiments, OSI can be transmitted based on the base station decision or based on request from UE. OSI can be transmitted either in broadcast manner, in multicast manner or in unicast manner. Digital signature can be transmitted in the last part of the system information. Digital signature can be placed after the time information such as UTC or time slot information within system information transmitted by base station. Digital signature can be transmitted within the system information carrying UTC. Digital signature can be transmitted within the system information carrying base station identification information.

In various embodiments, cell verification for the cell UE reselects can fail. In such case, UE can perform cell selection procedure toward different cell. Cell selection procedure, unlike cell reselection procedure, is performed without consideration on the information received in the current cell. For example, UE can use the stored information such as previous camped cell information and priorities on frequency search to find neighbor cell to camp on. In various embodiments, UE can delete the system information received from the previous candidate cell (GNB-1). In various embodiments, UE can ignore at least part of system information received from the previous candidate cell (GNB-1). For example, even if "intraFreqReselection" received from the previous candidate cell is "allowed", UE consider it as default value (e.g. "not allowed") and search for other frequency.

In various embodiments, UE can report the information on the previous candidate cell (GNB-1) to the network. In the first embodiment, UE can report the information in the cell where UE successfully camp on. The information on the previous candidate cell can include at least one of followings.

Location of UE
Time when digital signature verification failure occurs in UTC
Part of or all of the SIB1 transmitted in the previous candidate base station (GNB-1)

PLMN identity, TAC and cell identity in CellAccessRelatedInfo
at least a part of information acquired from PBCH (physical broadcast channel)/SS (Synchronization signals)
PCI (Physical Cell Identity), SFN (System Frame Number)

In various embodiments, UE can consider for a specific period the previous candidate base station/cell (GNB-1) as barred cell. That UE consider a cell as barred cell means UE stores the identity of the cell (Physical Cell Identity or Global Cell Identity or both) and does not camp on the cell.

In various embodiments, UE can receive information related with system verification in RRC connection establishment message during attach procedure. The information related with system verification can include public keys of TAIs wherein one public key is associated with a TAI. UE performs cell reselection process in RRC IDLE state as specified in the relevant standard specification. Cell reselection procedure can be performed based on the information received from the current base station (GNB-1). Aforementioned information can be included in RRC release message transmitted by the current base station (GNB-1). Aforementioned information can be included in the system information (e.g., SIB4, SIB5, or SIB24) transmitted by the current base station (GNB-1). The cell reselected by the UE can belong to the base station (GNB-2) of different TA.

In various embodiments, UE can receive at least one system information from the reselected cell. Aforementioned at least one system information can include the information necessary for cell verification procedure. Aforementioned information necessary for cell verification procedure can include at least one of time information (UTC or time count), base station identification number and digital signature.

UE can perform cell verification procedure for the reselected cell. In various embodiments, UE can use at least one of system information transmitted in the reselected cell for cell verification procedure. Aforementioned at least one system information can include at least one of time information, base station identification number and digital signature. UE can use the information received via registration accept message for cell verification procedure. Aforementioned the information received via registration accept message can include public key per TAI.

Cell (base station) verification procedure is explained in more details. In the first embodiment, UE can generate digital signature using the information included in registration accept message. UE can generate digital signature using at least part of the information included in the system information where UE camp on via cell selection or cell reselection procedure.

In the first embodiment, UE can check the digital signature received from the cell where UE camps on via cell selection or cell reselection. Base station can broadcast digital signature included in system information.

In various embodiments, UE can compare the digital signature generated by itself and the digital signature received from the system information. If two digital signatures are same to each other, UE consider the cell is verified. If two digital signatures are different each other, UE consider the cell is failed to be verified.

Figure 3:
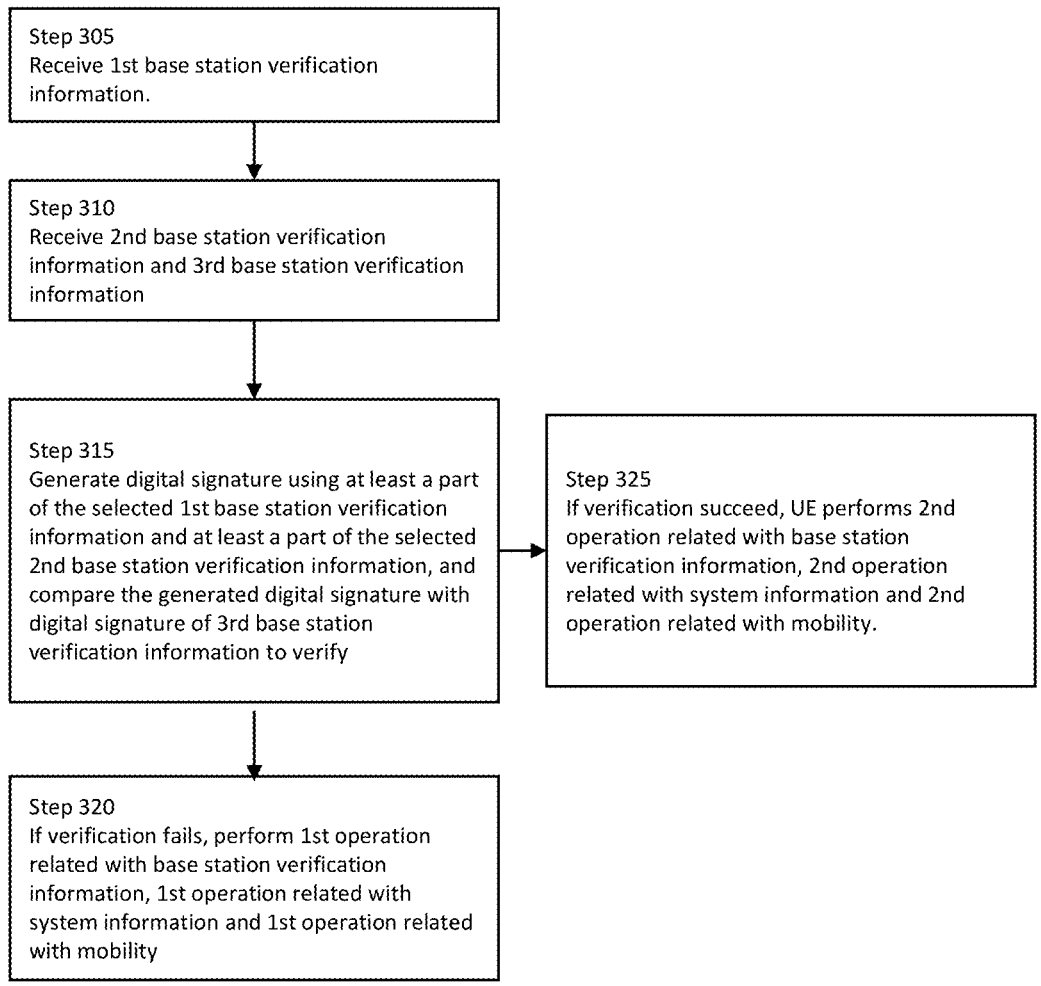
FIG. 3 is a diagram illustrating the operation of UE according to an embodiment of the present disclosure.

UE operation is explained in the FIG. 3.

In 305, UE performs Tracking Arear Update procedure or registration procedure. During the procedure, UE receives $1^{st}$ base station verification information via RRC control message. The RRC control message can be DLInformationTransfer. DLInformationTransfer is a RRC control message carrying (or including) a control message of AMF. A set of $1^{st}$ base station verification information can include Tracking Area Identity (or Tracking Area Code) and Public Key (or shared key). UE can receive from a AMF multiple set of $1^{st}$ base station verification information. UE can move to new NR cell after completion of above procedures.

In 310, UE receives via common channel of the new NR cell $2^{nd}$ base station verification information, $3^{rd}$ base station verification information and $4^{th}$ base station verification information. $2^{nd}$ base station verification information is the information for digital signature calculation. $3^{rd}$ base station verification information is digital signature. $4^{th}$ base station verification information is the information for digital signature calculation which is different from the $2^{nd}$ base station verification information.

$2^{nd}$ base station verification information can include following information
$2^{nd}$ base station verification information: PLMN identity, Tracking Arear Code, Cell Identity, System Frame Number, time information.

For some part of $2^{nd}$ base station verification information multiple instances can be received from a same cell. For example, for the purpose of network sharing, a SIB can contain (carry, include) multiple PLMN identities, multiple Tracking Arear Codes and multiple Cell Identities.

System Frame Number is received via Master Information Block. PLMN identity, Tracking Arear Code and Cell Identity are received via System Information Block 1. Time Information is received via System Information Block 9. Time Information is UTC (Coordinated Universal Time). UTC is an integer between 0 and 549755813887 indicating the elapsed time since a specific point of time. 1 denotes 10 minutes. Part of Time Information instead of full Time Information can be used for base station verification. Part of the Time Information used for based station verification can be transmitted in SIB 1 and Full Time Information can be transmitted in SIB9.

$4^{th}$ base station verification information is at least a part of information included in SIB1 and used as input for digital signature calculation (generation or derivation). The at least a part of information will be explained later.

In 315, UE selects, using at least a part of information of $2^{nd}$ base station verification information, one set of $1^{st}$ base station verification information from multiple sets of $1^{st}$ base station verification information. UE generates (or calculates) digital signature using at least a part of the selected $1^{st}$ base station verification information, at least a part of $2^{nd}$ base station verification information which is different from above at least a part of information of $2^{nd}$ base station information used for selection of $1^{st}$ base station verification information and $4^{th}$ base station verification information.

UE determines whether base station is successfully verified or not by comparing the digital signature generated by itself and digital signature of $3^{rd}$ base station verification information. Digital Signature is also called Message Authentication Code. $3^{rd}$ base station verification information is the digital signature calculated by the base station. $4^{th}$ base station verification information is system information used as input for digital signature calculation. $4^{th}$ base station verification information can be the information excluding specific information of SIB1. UE generates digital signature by inputting the security key of selected $1^{st}$ base station verification information, Time Information of $2^{nd}$ base station verification information and $4^{th}$ base station verification information into a security algorithm.

UE selects one set of $1^{st}$ base station verification information among multiple set of $1^{st}$ base station verification information as followings. A NR cell can have multiple instances of TrackingAreaCode/CellIdentity. Each of TrackingAreaCode/CellIdentity can be associated with multiple PLMN identities. UE selects, from the multiple instances of TACs in SIB1, the TAC associated with its registered PLMN. UE selects one set of $1^{st}$ base station verification information from the multiple sets of stored $1^{st}$ base station verification information according to the selected TAC.

UE generates digital signature using the public key of the selected $1^{st}$ base station verification information, Time Information of $2^{nd}$ base station verification information and $4^{th}$ base station verification information. UE compares the generated digital signature with the digital signature of $3^{rd}$ base station verification information. UE determines verification is successful if two digital signatures are same. UE determines verification is failed if two digital signatures are different from each other.

$4^{th}$ base station verification information can be the whole information included in SIB1 except Time Information and $3^{rd}$ base station verification information. $4^{th}$ base station verification information can be Master Information Block and the whole information included in SIB1 except Time Information and $3^{rd}$ base station verification information.

If verification fails, UE performs in 320 $1^{st}$ operation related with base station verification information, $1^{st}$ operation related with system information and $1^{st}$ operation related with mobility. If verification succeed, UE performs in 325 $2^{nd}$ operation related with base station verification information, $2^{nd}$ operation related with system information and $2^{nd}$ operation related with mobility.

$1^{st}$ operation related with base station verification information is as below. UE stores MIB and SIB1 in VarVerificationFailure. Above SIB1 includes following information
  PLMN identity, TAC and Cell Identity of the cell where verification fails.
  ServingCellConfigCommon of the cell where verification fails
  Scheduling information, for system information other than MIB and SIB1, of the cell where verification fails.
ServingCellConfigCommon is configuration information for random access and paging.

UE stores in VarVerificationFailure the time information for point of time when verification fails. The above time information can be in the form of UTC. UE calculates the UTC for time information based on the UTC broadcasted in the different cell from the cell where verification fails. UE stores in VarVerificationFailure the location information where verification fails. The location information can be GPS coordinates. UE can include WLAN measurement result and Bluetooth measurement result, if available, in the location information. UE stores in VarVerificationFailure measurement result available at the point of time when verification fails. The measurement result can include measured RSRP and measured RSRQ of the cell where verification fails and of other cells where measurement results are available.

$2^{nd}$ operation related with base station verification information is as following. UE includes in RRCConnectionSetupComplete, VerificationFailureAvailable to report the contents of VerificationFailureAvailable in the cell where verification succeeded. After then, UE receives UEInformationRequest, and if VerificationFailureReq is included in the message, UE sends UEInformationResponse including the information of VarVerificationFailure and discard the contents of VarVerificationFailure.

$1^{st}$ operation related with system information is as following. UE stores in VarVerificationFailure part of system information received from the cell where verification fails. UE discards System Information Block 1 without storing it in VarStoredSystemInfo.

$2^{nd}$ operation related with system information is as following. UE stores in VarStoredSystemInfo system information received in the cell where verification succeed. VarStoredSystemInfo and VarVerificationFailure hold different information.

$1^{st}$ operation related with mobility is as following. UE consider intraFreqReselection included in MIB of the cell where verification fails is Allowed to search new cell including the current frequency even if notAllowed is received in the cell where verification fails. UE does not use neighbor cell information included in the system information received in the cell where verification fails.

$2^{nd}$ operation related with mobility is as following. UE performs cell search on the frequencies including the current frequency if intraFreqReselection of Allowed is received in the cell where verification succeed. UE performs cell search on the frequencies excluding the current frequency if intraFreqReselection of notAllowed is received in the cell where verification succeed.

Figure 4:
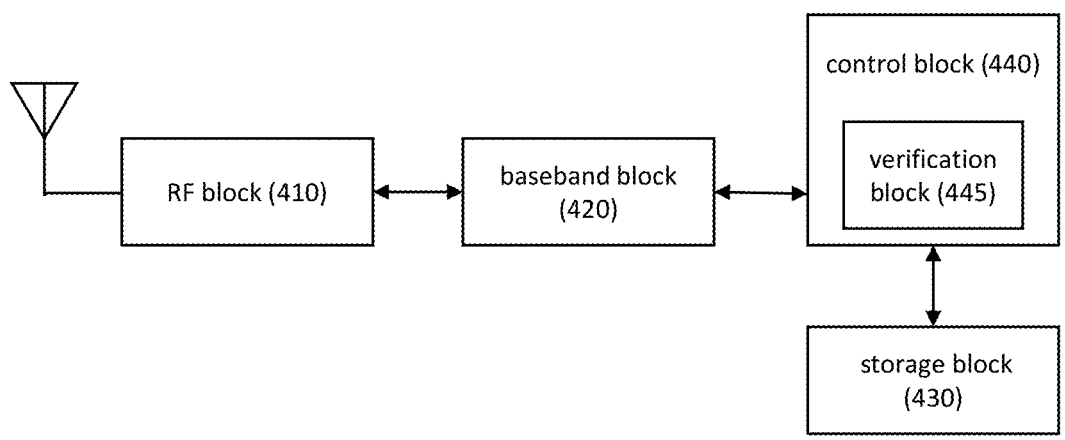
FIG. 4 is a block diagram illustrating a configuration of a UE according to various embodiments of the present disclosure.

FIG. 4 is a block diagram illustrating configuration of UE. According to FIG. 4, UE of the first embodiment can include transceiver and control block (440). UE can include storage block (430). Transceiver can include RF (radio frequency) block (410) and baseband block (420). RF block (410) process the baseband signal provided by baseband block (420). into RF signal and transmit it through the antenna. RF block can process the RF signal received through the antenna into baseband signal. RF block (410) can include filter, amplifier, mixer, oscillator, DAC (digital to analog convertor) and ADC (analog to digital convertor).

Baseband block (420) performs transforming between baseband signal and bit stream according to physical layer standard specification. Storage block (430) stores data necessary for UE operation such as basic program, application program and configuration information. Storage block (430) can provide data to control block (440) according to control block's request.

Control block (440) controls the blocks for UE to operate according to the various embodiments described in this disclosure. Control block can include verification block (445) for base station verification operation. Control block process RRC control message and system information, store necessary information in the storage block, provide necessary information to verification block for base station verification procedure. Control block also controls other blocks to perform necessary operations according to verification result.

FIG. 1 through 4, discussed below, and the various embodiments used to describe the principles of the present disclosure in this patent document are by way of illustration only and should not be construed in any way to limit the scope of the disclosure. Detailed description of well-known functions and structures incorporated herein may be omitted to avoid obscuring the subject matter of the present disclosure. Those skilled in the art will understand that the principles of the present disclosure may be implemented in any suitably arranged system or device. Embodiments of the present disclosure are described with reference to the accompanying drawings in detail.

Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like reference numerals refer to like elements throughout the specification. It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce manufacture articles embedding instruction means which implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

In this patent document, the term for identifying access node, the term for network entities, the term for messages, the term for the interface between network entities, or terms for other identification information are by way of illustration only and should not be construed in any way to limit the scope of the disclosure. It can be expressed by other term indicating to the thing equivalent technical meaning.

For the convenience for clarification, the embodiments of the present disclosure utilize the terms, the definition, or modified terms based on these the term or definition based on 3GPP LTE (3rd Generation Partnership Project Long Term Evolution) specified. However, these terms should not be construed in any way to limit the scope of the disclosure and may apply the other system which is based on other specification.

The invention claimed is:

1. A method by a terminal, the method comprising:
    receiving by the terminal, from a shared channel of a 1st cell, a plurality of 1st verification information included in a Radio Resource Control (RRC) control message;
    receiving, by the terminal, a system information from a common channel of a 2nd cell, wherein the system information comprises 2nd verification information, 3rd verification information, and 4th verification information, wherein the system information comprises a System Information Block 1 and at least one System Information Block different from the System Information Block 1;
    selecting a 1st verification information from the plurality of 1st verification information based on part of the 2nd verification information;
    verifying the 2nd cell by comparing the 3rd verification information with a digital signature generated based on the selected 1st verification information, at least part of the 2nd verification information, and at least part of the 4th verification information;
    transmitting by the terminal to the 2nd cell, based on verification of the 2nd cell being successful, a RRC-SetupRequest message;
    wherein the 1st verification information comprises a security key, and a tracking area code,
    wherein the 2nd verification information comprises a Public Land Mobile Network Identifier, a tracking area code and time information,
    wherein the 3rd verification information comprises a digital signature, and
    wherein the 4th verification information comprises at least part of the System Information Block 1.

2. The method of claim 1, further comprising transmitting by the terminal a RRCSetupComplete message to the 2nd cell, the RRCSetupComplete message includes information indicating availability of verification failure information of a 3rd cell, wherein the verification of the 3rd cell failed before verification of the 2nd cell.

3. The method of claim 1, further comprising:
    before the verification of the 2nd cell, storing, upon determining the verification of the $3^{rd}$ cell failed, at least part of the system information of the 3rd cell, location information of the terminal at the point of time the $3^{rd}$ cell verification failed, or time information representing the point of time the $3^{rd}$ cell verification failed.

4. The method of claim 1, further comprising:
    storing in a 1st variable, based on the verification of 2nd cell failing, 1st system information received from the 2nd cell and discarding the remaining system information received from the 2nd cell;
    determining that verification of the 3rd cell is successful; and
    storing in a 2nd variable, based on the verification of the 3rd cell being successful, the system information received from the 3rd cell;
    wherein the 1st system information is at least a part of System Information Block 1, the 1st variable is a variable holding information related to the verification failure and the 2nd variable is a variable holding system information.

5. The method of claim 1, further comprising:
determining the verification of the 2nd cell has failed after receiving an intraFreqReselection from the 2nd cell which indicates notAllowed; and
searching for a new cell on a 2nd cell frequency.

6. The method of claim 1, further comprising:
determining whether verification of the 2nd cell is successful; and
searching, based on the verification of the 2nd cell being successful, new cells on frequencies different from the 2nd cell frequency because an intraFreqReselection received in the 2nd cell indicates notAllowed.

7. A wireless communication system, the wireless communication
system comprising:
at least a 1st cell, a 2nd cell and a 3rd cell;
at least a terminal, wherein the terminal comprises:
  a transceiver configured to transmit and receive a signal; and
  a controller configured to control the transceiver to:
    receive, from a shared channel of the 1st cell, a plurality of 1st verification information included in an Radio Resource Control (RRC) control message;
    receive a system information from a common channel of the 2nd cell, wherein the system information comprises 2nd verification information, 3rd verification information, and 4th verification information, wherein the system information comprises a System Information Block 1 and at least one System Information Block different from the System Information Block 1;
    select a 1st verification information from the plurality of 1st verification information based on part of the 2nd verification information;
    verify the 2nd cell by comparing the 3rd verification information and with a digital signature generated based on the selected 1st verification information, at least part of the 2nd verification information, and at least part of the 4th verification information;
    transmit by the terminal to the 2nd cell, based on verification of the 2nd cell being successful, a RRCSetup message;
  wherein the 1st verification information comprises a security key, and a tracking area code,
  wherein the 2nd verification information comprises a Public Land Mobile Network Identifier, a tracking area code and time information,
  wherein the 3rd verification information comprises a digital signature, and
  wherein the 4th verification information comprises at least part of the System Information Block 1.

8. The wireless communication system of claim 7, further comprising transmitting by the terminal a RRCSetupComplete message is transmitted to the 2nd cell, the RRCSetupComplete message includes information indicating availability of verification failure information of a 3rd cell, wherein verification of the 3rd cell failed before verification of the 2nd cell.

9. The wireless communication system of claim 7, availability of verification failure information comprises 1 bit of information.

10. The wireless communication system of claim 7, further comprising:
before the verification of the 2nd cell, storing, upon determining the verification of the $3^{rd}$ cell failed, at least part of the system information of the 3rd cell, location information of the terminal at the point of time the $3^{rd}$ cell verification failed, or time information representing the point of time the $3^{rd}$ cell verification failed.

11. The wireless communication system of claim 7, wherein the terminal controller is further configured to control the transceiver to:
transmit to the 3rd cell, upon determining verification of the 3rd cell is successful, a RRCConnectionSetupComplete message including 1 bit of information indicating availability of verification failure information of the 2nd cell because verification of the 2nd cell failed;
receive from the 3rd cell, a UEInformationRequest message including 1 bit of information instructing the terminal to report the verification failure information;
transmitting by the terminal to the 3rd cell, a UEInformationResponse message including at least part of system information received from the 2nd cell where the verification failed, the location information of the terminal at point of time that the verification failed, and the time information representing the point of time that the verification failed.

12. The wireless communication system of claim 7, wherein the terminal controller is further configured to:
store in a 1st variable, because the verification of 2nd cell has failed, a 1st system information received from the 2nd cell and discarding the remaining system information received from the $2^{nd}$d cell;
determine that verification of the 3rd cell is successful; and
store in a 2nd variable, because the verification of the 3rd cell is successful, the system information received from the 3rd cell;
wherein the 1st system information is at least a part of System Information Block 1, the $1^{st}$ variable is a variable holding information related to the verification failure and the 2nd variable is a variable holding system information.

13. The wireless communication system of claim 7, wherein the controller is further configured to:
determine the verification of the 3rd cell has failed after receiving an intraFreqReselection from the 3rd cell which indicates notAllowed; and
control the transceiver to search for a new cell on a 3rd cell frequency.

14. The wireless communication system of claim 7 wherein the
controller is further configured to:
determine that verification of the 2nd cell is successful; and
control the transceiver to:
search, based on the verification of the 2nd cell being successful, new cells on frequencies different from the 3rd cell frequency because an intraFreqReselection received in the 2nd cell indicates notAllowed.

15. The wireless communication system of claim 7, wherein:
at least the 1st cell, the 2nd cell and the 3rd cell are deployed according to the 5th generation communication standard as defined by the 3rd Generation Partnership Project.

16. The wireless communication system of claim 7, wherein:

at least the 1st cell, the 2nd cell and the 3rd cell are deployed according to the 4th generation communication standard as defined by the 3rd Generation Partnership Project.

\* \* \* \* \*